June 9, 1925.
G. A. SEIB
1,540,907
TYPEWRITING MACHINE
Filed May 25, 1923
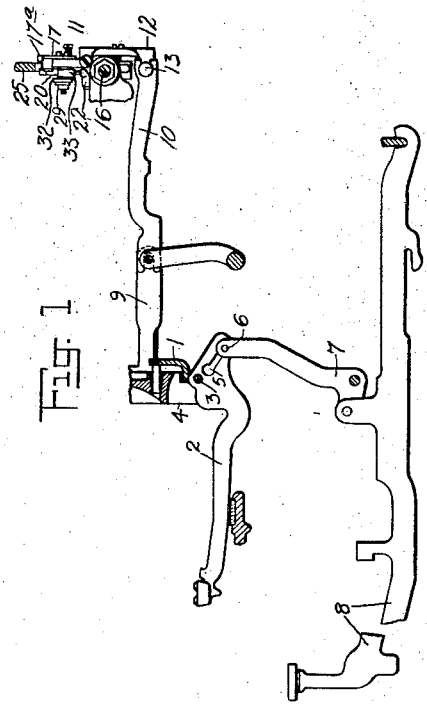

Patented June 9, 1925.

1,540,907

UNITED STATES PATENT OFFICE.

GEORGE A. SEIB, OF ILION, NEW YORK, ASSIGNOR TO REMINGTON TYPEWRITER COMPANY, OF ILION, NEW YORK, A CORPORATION OF NEW YORK.

TYPEWRITING MACHINE.

Application filed May 25, 1923. Serial No. 641,313.

*To all whom it may concern:*

Be it known that I, GEORGE A. SEIB, citizen of the United States, and resident of Ilion, in the county of Herkimer and State of New York, have invented certain new and useful Improvements in Typewriting Machines, of which the following is a specification.

My invention relates to stop devices for use in typewriting machine, and its chief object is to provide new and improved stop devices which are especially adapted for employment in connection with the escapement dogs of such machines, said stop devices assisting to render the action of a dog practically noiseless while at the same time avoiding the increased friction that has heretofore resulted from the employment of some styles of so-called noiseless stop devices.

To the above and other ends which will hereinafter appear, my invention consists in the features of construction, combinations of devices and arrangements of parts hereinafter described and particularly pointed out in the claims.

In the accompanying drawings,

Figure 1 is a skeletonized side elevation, partly in section and drawn to a reduced scale, showing the type action, dog carrier, universal bar and connections employed in a Remington typewriting machine to which my invention is herein shown as applied.

Figure 2 is a fragmentary front elevation of a dog carrier or rocker showing my invention applied thereto.

Figure 3 is a view corresponding to Fig. 2 but showing some of the parts in different relations and omitting other parts.

Figures 4 and 5 are fragmentary views corresponding respectively to Figs. 2 and 3 but with parts sectioned away in order more clearly to develop the action of the stop devices.

Figure 6 is a horizontal sectional view taken on a plane indicated by the section line 1 in Fig. 2 and looking in the direction of the arrows at said line.

Figure 2 to 6 are drawn to an enlarged scale.

As appears from Fig. 1, the universal bar 1 which is curved in form is operative by printing instrumentalities comprising a type bar 2 which is one of a series that contactively engages with the universal bar to move it rearward. The series of type bars are pivoted on a wire 3 mounted on a type bar segment 4, each type bar being provided with a slot 5 engaged by a pin 6 carried by a bell crank 7 which is actuated by a key lever 8. The universal bar is operatively connected by a train of devices comprising a rearwardly extending arm 9 and a link 10 with a dog carrier or rocker 11 which has a downward extension or arm 12 from which projects a pin 13 that is engaged by the slotted rear end of the link 10. The dog carrier or rocker 11 comprises an upstanding portion 14 and a cross portion 15 having trunnions formed with depressions which are engaged by stationary pivot pins 16 on which said dog rocker swings fore-and-aft of the machine when actuated. The upstanding part 14 of the dog rocker 11 carries escapement dogs or detents, the rear or rigid dog 17 being adjustably secured to the back of the rocker by screws 18 and 19. The stepping or loose dog 20 has a tail portion 21 and is pivoted at 22 to the front of the upright arm or portion 14 of the dog rocker. The tail portion 21 carries a pin 23 over which is hooked the lower end of a coiled spring 24, the upper end of which is preferably connected to a novel stop device hereinafter described, although, if desired, said upper end may be anchored directly to the dog carrier. The spring 24 tends constantly to throw the stepping dog leftward transversely of the machine but is normally overcome by the carriage main spring acting through the usual rack member or toothed escapement wheel 25, one of the teeth of said wheel normally engaging with the upper end of the dog 20 and maintaining said dog engaged as in Fig. 2 with the novel stop devices hereinafter described. When the upper end portion of the rocker is swung forward at printing operation, the dog 20 is carried out of the plane of the escapement wheel 25 and disengages from the lowermost tooth thereof, the rigid dog 17 being swung forward so that its beveled portion 17ª will engage the same tooth. As soon as the dog 20 disengages from the escapement wheel it is swung by its spring 24 on its pivot 22 leftward independently of and relatively to the dog rocker, being arrested at the end of its pivotal movement preferably by a spring stop device of the character fully disclosed in the pending application of R. J. Lewis, Sr. No. 572,453 filed July 3, 1922. Said stop device comprises a coiled stop spring 27 surrounding the stem of the screw 19 which is elongated forward of the rocker, the spring being held in place by a flanged collar or nut 29 which is threaded on said screw stud 19. The spring stop 27 minimizes the noise incident to the arrest of the stepping dog at the end of its stepping movement; and in order to minimize the noise incident to the arrest of the stepping dog at the end of its return movement, I have provided in lieu of the stop device heretofore employed for this purpose the novel stop devices next to be described.

Said stop devices are or may be mounted on a screw stud 30 of ordinary construction, said stud being threaded into the upright portion 14 of the dog carrier from the rear to the front, the point of said stud usually acting as a stop to limit the forward swinging of the dog rocker. Threaded on the forwardly projecting portion of the stud 30 at the front side of the rocker part 14 is a nut or collar 31 having a flange 32, the flanged collar 31, 32 providing a support for an annular stop device 33, and also acting to set the stud 30 on the rocker. The circular cut-out or eye 34 of said annular stop device is of considerably greater diameter than the collar 31 on which it loosely fits, but the head or flange 32 of said collar is of greater diameter than the hole or eye 34 and prevents accidental displacement of the stop device 33 from its bearing or support 31. The device 33 is loosely confined between the head 32 of the collar and the front face of the carrier part 14 so as not to interfere with rolling or turning movements of the annular stop device 33 on its support 31. Thus the ring-like stop 33 loosely embraces the interiorly arranged relatively small support 31, 32. Said annular stop device is provided with a radial extension or tail piece 35 which is perforated to receive the upper hooked end of the dog spring 24, said spring being hooked into the perforated tail portion 35 of the stop 33 and thereby connecting the stop with the stepping dog 20. This construction is preferred since it enables a single spring to be employed for stepping the dog and controlling its stop, but if desired the stop may be provided with its own separate spring. It may further be noted that while it is preferred to mount the stop device 33—35 in the manner described by means of the flanged collar 31, 32 yet said collar may be dispensed with and the stop device loosely hung or supported on the stud 30, or on any other suitable projection on the dog carrier.

Normally the novel stop device 33—35 is maintained in the position shown in Figs. 2, 4 and 6 with the left side of the hole or eye 34 pressed against the left side of the collar or support 31. This position of the stop device is due to the action of the stepping dog 20, the upper part of the right-hand face of said dog being held pressed against the outer left-hand face of the annular part 33 by the action of the engaged tooth of the escapement wheel 25 on the upper end of said dog. It will be perceived that the dog presses the part 33 tightly against the collar 31 and that the dog is thus positively arrested normally. When the carrier is rocked as described on its pivots 16, swinging the dog 20 forward out of the escapement wheel, said dog on being freed will be swung leftward on its pivot 22 relatively to the carrier 11 by the spring 24 until arrested by the stop 27. During this swinging movement of the dog, it will be followed by the stop 33—35 whose outer face will be maintained constantly in contact with the dog by the spring 24, said spring causing the stop device to roll easily and freely on its support 31, the point of contact of the eye 34 with said support constantly changing until the parts are finally arrested in the positions shown in Figs. 3 and 5. As the dog rocker swings back to normal position, the dog 20 will re-enter the escapement wheel and will be restored by said wheel to normal position, said dog swinging on its pivot 22 from the Fig. 3 back to the Fig. 2 position. As the dog swings back, it will force ahead of it the stop device 33—35, the two elements remaining contsantly in contact and the stop rolling on its support 31 back to the positions shown in Figs. 2, 3 and 5 where the parts will be finally arrested. The outlined operation will of course be repeated at each complete actuation of the dog carrier.

It will be seen that during the vibration of the dog 20, 21 the stop 33—35 will at all times remain in contact with it, said stop also constantly remaining in contact with its support 31. Thus noise incident to the striking of the dog against a stop which normally arrests it is avoided, and by reason of the novel rolling action of the loosely mounted stop on its support, the friction which is unavoidable in the case of a stop having a regular pivotal mounting is practically done away with. These stop devices are of simple and inexpensive construction, and may be applied to existing styles of typewriting machines without necessitating material alteration of such machines.

Besides such changes as have been indicated, various other changes may be made without departing from my invention.

What I claim as new and desire to secure by Letters Patent is:—

1. In escapement mechanism for typewriting machines, the combination of a dog carrier, a dog movably supported thereon, a stop for said dog contactive with the dog in all of its positions, and a support fixed relatively to said stop, said stop being loosely mounted on said support.

2. In escapement mechanism for typewriting machines, the combination of a toothed member, a dog carrier, a stepping dog on said carrier movable with said carrier into and out of said toothed member and also adapted for stepping movements independently of said carrier, a stop for said dog, and a support with which said stop has a loose connection.

3. In escapement mechanism for typewriting machines, the combination of a toothed member, a dog carrier, a stepping dog on said carrier movable with said carrier into and out of said toothed member and also adapted for stepping movements independently of said carrier, a stop for said dog, and a stop support, said stop constantly engaging with both said dog and said support, engagement of said stop with both said dog and said support varying during stepping movements of said dog.

4. In escapement mechanism for typewriting machines, the combination of a dog carrier, a dog movably supported thereon, a stop for said dog, and a support for said stop, said stop having a rolling contact with both said dog and said support.

5. In escapement mechanism for typewriting machines, the combination of a dog carrier, a dog movably supported thereon, a stop for said dog, a support for said stop, and spring means connected directly to said stop and effective to maintain said stop in contact with both said dog and said support, the points of contact of said stop with both said dog and said support varying during escapement movements of said dog.

6. In escapement mechanism for typewriting machines, the combination of a toothed member, a key-actuated dog carrier, a stepping dog on said carrier movable with said carrier into and out of said toothed member and also adapted for stepping movements independently of said carrier, an annular dog stop, a projection on said dog carrier with which said annular stop loosely engages, and a spring for said stop.

7. In escapement mechanism for typewriting machines, the combination of a toothed member, a key-actuated dog carrier, a stepping dog on said carrier movable with said carrier into and out of said toothed member and also adapted for stepping movements independently of said carrier, an annular stop having its outer face constantly contactive with said dog, and a support for said stop with which its inner face constantly contacts, the contactive points on said inner face varying.

8. In escapement mechanism for typewriting machines, the combination of a toothed member, a dog carrier, a stepping dog on said carrier movable with said carrier into and out of said toothed member and also adapted for stepping movements independently of said carrier, an annular stop having its outer face constantly contactive with said dog, a support for said stop with which its inner face constantly and variably contacts, and a spring connected to said annular stop for effectuating its contactive engagement both with its support and with said dog.

9. In escapement mechanism for typewriting machines, the combination of a toothed member, a dog carrier, a stepping dog on said carrier movable with said carrier into and out of said toothed member and also adapted for stepping movements independently of said carrier, a headed projection on said carrier, an annular stop mounted on said projection and loosely confined between the face of said carrier and the head of said projection, and a spring connected to said annular stop for maintaining it constantly engaged both with said dog and with said headed projection.

10. In escapement mechanism for typewriting machines, the combination of a dog carrier, a dog on said carrier, a screw on said carrier, a flanged collar threaded on said screw, an annular stop for said dog loosely supported on said collar, and a spring connected at one end to said dog and having its other end connected to said annular stop.

11. In escapement mechanism for typewriting machines, the combination of a toothed member, a dog carrier, a dog on said carrier, a spring for said dog, a support on said carrier, a stop loosely mounted on said support, said dog spring being also connected to said dog, said spring acting to move said dog and also to maintain the stop constantly contactive with both said dog and said support.

12. In escapement mechanism for typewriting machines, the combination of a dog carrier, a dog movably mounted thereon, a comparatively large ring-like movable stop for said dog embracing an interiorly arranged relatively small support mounted on said carrier, and a single spring effective to move both said dog and said stop.

Signed at Ilion, in the county of Herkimer and State of New York, this 21st day of May, A. D. 1923.

GEORGE A. SEIB.

Witnesses:
LINNIE F. BURNETT,
H. C. SHEPARD.